US012788202B2

(12) United States Patent
Andrasfi et al.

(10) Patent No.: US 12,788,202 B2
(45) Date of Patent: Nov. 10, 2026

(54) SWEEPER MOP WITH ADJUSTABLE SIZED HEAD

(71) Applicant: Target Brands, Inc., Minneapolis, MN (US)

(72) Inventors: Csaba Andrasfi, Oakdale, MN (US); Nicholas Cyr, Santa Clarita, CA (US); David A. Parrott, Cincinnati, OH (US); Qiuyu Lu, Fenghua (CN); Chengyong Dong, Ningbo (CN)

(73) Assignee: Target Brands, Inc., Minneapolis, MN (US)

( * ) Notice: Subject to any disclaimer, the term of this patent is extended or adjusted under 35 U.S.C. 154(b) by 322 days.

(21) Appl. No.: 18/667,348

(22) Filed: May 17, 2024

(65) Prior Publication Data

US 2025/0352022 A1 Nov. 20, 2025

(51) Int. Cl.

| | |
|---|---|
| ***A47L 13/42*** | (2006.01) |
| ***A47L 13/256*** | (2006.01) |
| ***A47L 13/258*** | (2006.01) |
| *B25G 1/04* | (2006.01) |

(52) U.S. Cl.

CPC ........... *A47L 13/258* (2013.01); *A47L 13/256* (2013.01); *A47L 13/42* (2013.01); *B25G 1/04* (2013.01)

(58) Field of Classification Search

CPC ....... B25G 1/04; A47L 13/256; A47L 13/258; A47L 13/42

See application file for complete search history.

(56) References Cited

U.S. PATENT DOCUMENTS

| | | | | |
|---|---|---|---|---|
| 3,877,103 | A | 4/1975 | Nash | |
| 4,845,800 | A | 7/1989 | Pederson et al. | |
| 5,461,749 | A * | 10/1995 | Ahlberg | A47L 13/256 15/228 |
| D409,343 | S | 5/1999 | Kingry et al. | |
| 5,979,004 | A * | 11/1999 | Wilson | A47L 13/146 15/119.2 |
| D423,742 | S | 4/2000 | Kingry et al. | |
| 6,098,239 | A * | 8/2000 | Vosbikian | A47L 13/51 15/228 |
| 6,305,046 | B1 | 10/2001 | Kingry et al. | |
| 6,484,346 | B2 | 11/2002 | Kingry et al. | |
| 6,651,290 | B2 | 11/2003 | Kingry et al. | |
| 8,276,234 | B2 | 10/2012 | Hsu | |
| 9,226,639 | B1 * | 1/2016 | Sheu | A47L 13/44 |

(Continued)

*Primary Examiner* — Michael D Jennings

(74) *Attorney, Agent, or Firm* — Leanne Taveggia Farrell; Westman, Champlin & Koehler, P.A.

(57) ABSTRACT

A sweeper mop includes a handle and an adjustable sized head configured to receive different sized cleaning sheets. The head includes a base and at least one rotatable member rotatably coupled to the base having a first surface and an opposing second surface. The head includes an unfolded configuration defined by a first width where the first surface of the at least one rotatable member is configured to face in a same direction as the upper surface of the base. The head includes a folded configuration defined by a second width that is less than the first width where the first surface of the at least one rotatable member is configured to face the upper surface of the base. The sweeper mop further includes a first lock configured to lock the head in the unfolded configuration and a second lock configured to lock the head in the folded configuration.

20 Claims, 16 Drawing Sheets

(56) References Cited

U.S. PATENT DOCUMENTS

| | | | | |
|---|---|---|---|---|
| 9,408,518 | B2 | 8/2016 | Bradbury | |
| 9,498,879 | B1 * | 11/2016 | Morad | B25G 3/26 |
| 9,918,607 | B1 * | 3/2018 | Lewis | A47L 13/253 |
| 9,980,622 | B2 | 5/2018 | Soller et al. | |
| 2004/0163194 | A1 * | 8/2004 | Wang | A47L 13/12<br>15/245 |
| 2011/0167583 | A1 | 7/2011 | Weaver et al. | |
| 2012/0023696 | A1 * | 2/2012 | Huang | A47L 13/256<br>15/231 |
| 2012/0110814 | A1 * | 5/2012 | Matola | A47L 13/256<br>29/428 |
| 2019/0374085 | A1 * | 12/2019 | Batts | A47L 13/258 |
| 2024/0032742 | A1 * | 2/2024 | Harrington | B25G 1/04 |
| 2024/0359663 | A1 * | 10/2024 | Lee | A47L 1/06 |

* cited by examiner

SWEEPER MOP WITH ADJUSTABLE SIZED HEAD

BACKGROUND

Sweeper mops are cleaning tools that have heads designed to receive and secure a disposable cleaning sheet or pad. The disposable cleaning sheet allows the sweeper mop to remove dust, dirt, and allergens from surfaces, such as finished floors. Exemplary finished floors include wood, tiled or laminate floors.

The discussion above is merely provided for general background information and is not intended to be used as an aid in determining the scope of the claimed subject matter.

SUMMARY

A sweeper mop includes a handle and an adjustable sized head configured to receive different sized cleaning sheets. The head includes a base having a handle mount mounted to an upper surface of the base and configured to be coupled to an end of the handle. At least one rotatable member rotatably coupled to the base and having a first surface and an opposing second surface. The head includes an unfolded configuration defined by a first width where the first surface of the at least one rotatable member is configured to face in a same direction as the upper surface of the base. The head includes a folded configuration defined by a second width that is less than the first width where the first surface of the at least one rotatable member is configured to face the upper surface of the base. The sweeper mop further includes a first lock configured to lock the head in the unfolded configuration and a second lock configured to lock the head in the folded configuration.

A sweeper mop includes a handle and an adjustable sized head configured to receive a cleaning sheet. The head includes a base having a mount coupled to an end of the handle and at least one rotatable member rotatably coupled to the base. The adjustable sized head includes an unfolded configuration and a folded configuration. The at least one rotatable member includes a first surface and an opposing second surface, at least one aperture that extends from the first surface to the second surface and at least one attachment feature that protrudes from the first surface of the rotatable member to a free end. The base includes an upper surface, at least one recess that is recessed from the upper surface of the base and at least one attachment feature that protrudes from the upper surface of the base to a free end. In the folded configuration, the first surface of the rotatable member is configured to engage with the upper surface of the base such that the at least one protruding attachment feature of the base mates with the aperture of the rotatable member and the at least one protruding attachment feature of the rotatable member mates with the at least one recess of the base.

A sweeper mop with an adjustable sized head includes a base having a mount coupled to an end of the handle. The base includes an upper surface, at least one recess that is recessed from the upper surface of the base and at least one attachment feature that protrudes from the upper surface of the base to a free end. At least one rotatable member is rotatably coupled to the base. The at least one rotatable member includes a first surface, an opposing second surface, at least one aperture that extends from the first surface to the second surface of the rotatable member and at least one attachment feature that protrudes from the first surface of the rotatable member to a free end. In an unfolded configuration, the first surface of the rotatable member is configured to face in a same direction as the upper surface of the base. In a folded configuration, the first surface of the rotatable member is configured to engage with the upper surface of the base such that the at least one protruding attachment feature of the base mates with the aperture of the rotatable member and the at least one protruding attachment feature of the rotatable member mates with the at least one recess of the base.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION

Sweeper mops that receive disposable cleaning sheets or pads are each sold with different width-sized heads. A sweeper mop with a small, regular width-sized head is configured to receive small, regular size cleaning sheets or pads and is useful in sweeping and collecting dust and dirt in small, tight spaces. A sweeper mop with a large sized head is configured to receive large width-sized cleaning sheets or pads and is useful in sweeping and collecting dust and dirt in large, open areas. Embodiments described below include a sweeper mop that includes an adjustable sized head that is configured to receive and secure different sized disposable cleaning sheets or pads. In a first or unfolded configuration, the head of the sweeper mop is configured to receive a large width-sized cleaning sheet or pad, and in a second or folded configuration, the head of the sweeper mop is configured to receive a small, regular width-sized cleaning sheet or pad.

Figure 1:
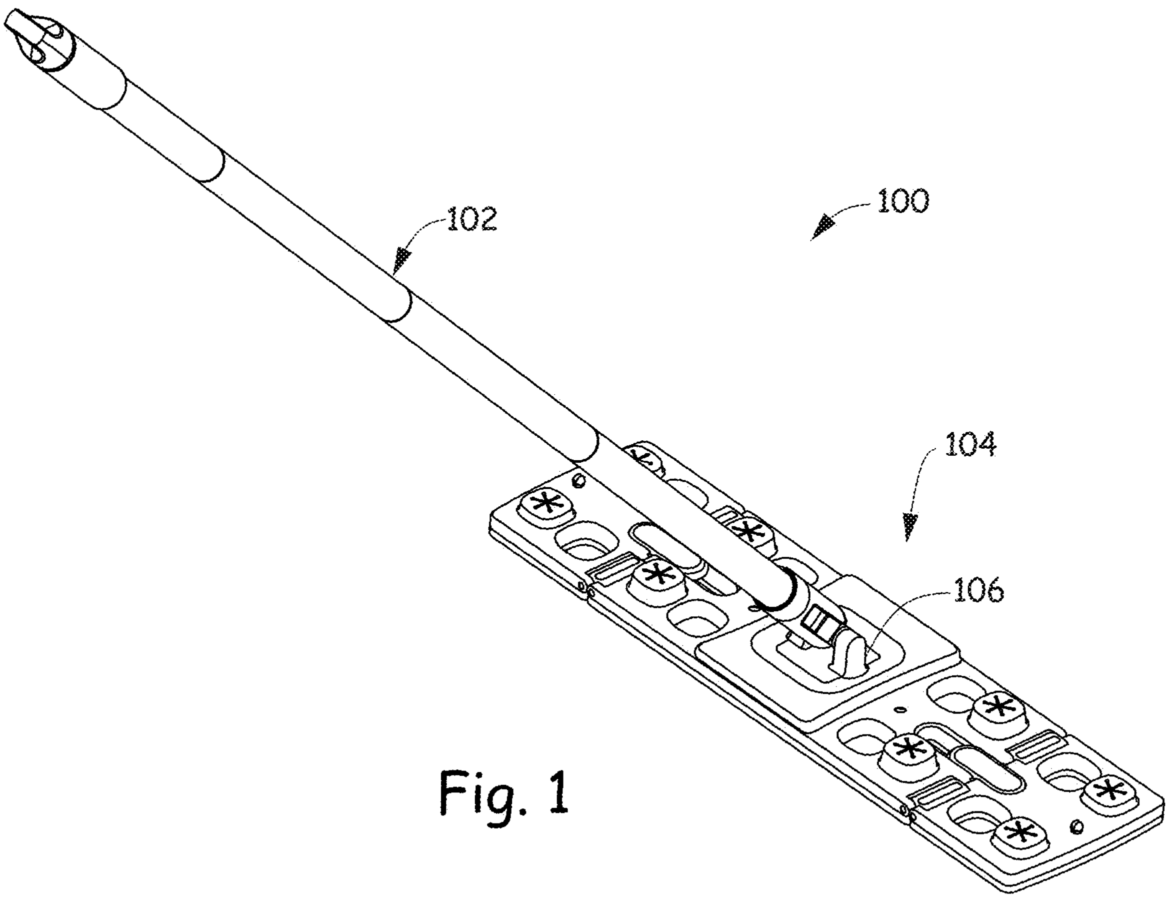
FIG. 1 is a perspective view of a sweeper mop having a handle and a head in an unfolded and unlocked configuration according to an embodiment.

FIG. 1 is a perspective view of a sweeper mop or cleaning device 100 having a handle 102 and an adjustable sized head 104 configured in a first or unfolded configuration according to an embodiment. As illustrated, an end of handle 102 is pivotally coupled to head 104 by a handle mount 106. Handle 102 is configured to be grasped by a user for manipulating head 104, which is configured to receive a cleaning sheet or pad (not illustrated) and is pushed by a user along a finished floor to collect and remove dirt and dust.

Figure 2:
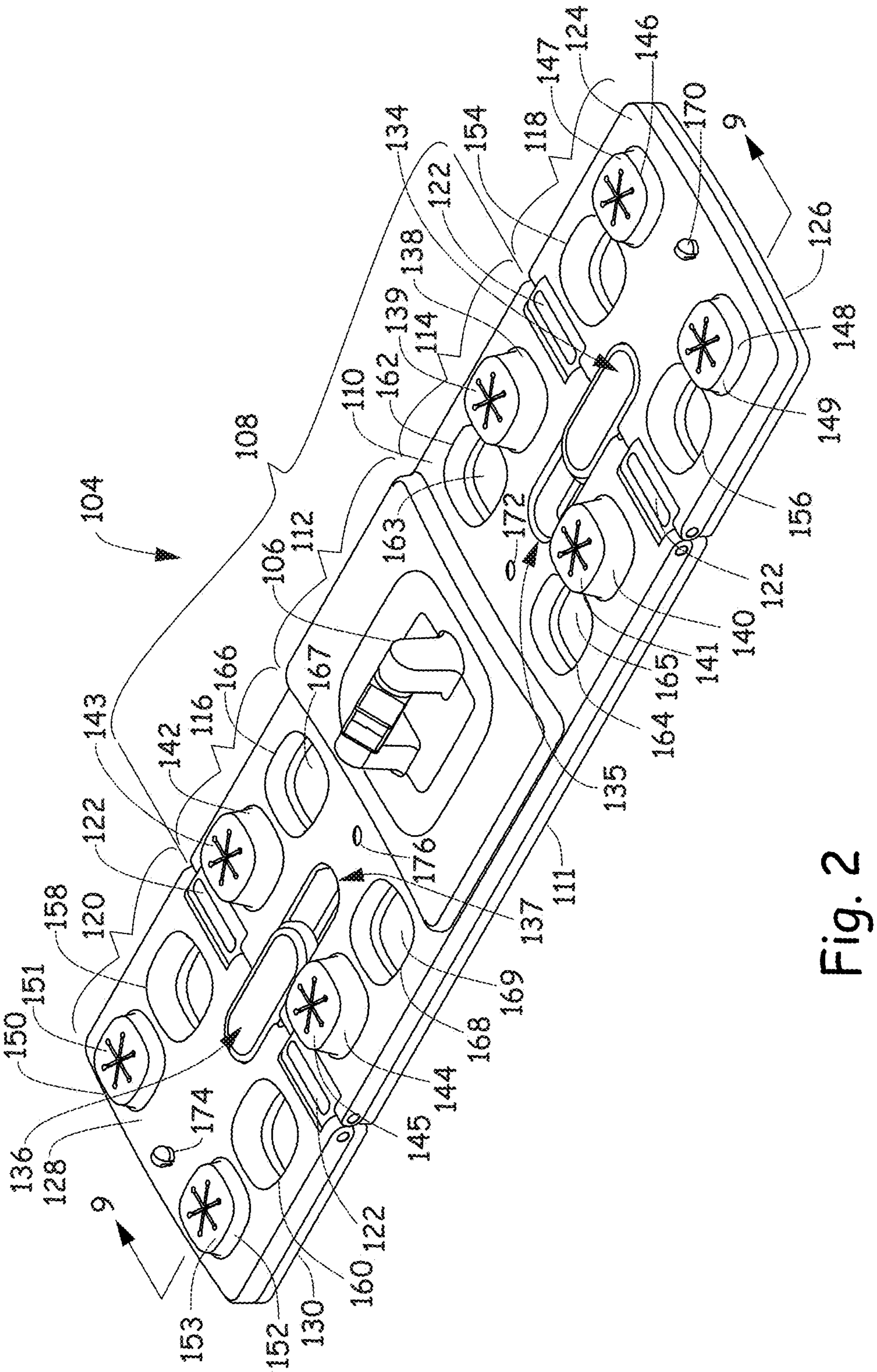
FIG. 2 is a top perspective view of the head of FIG. 1.
Figure 3:
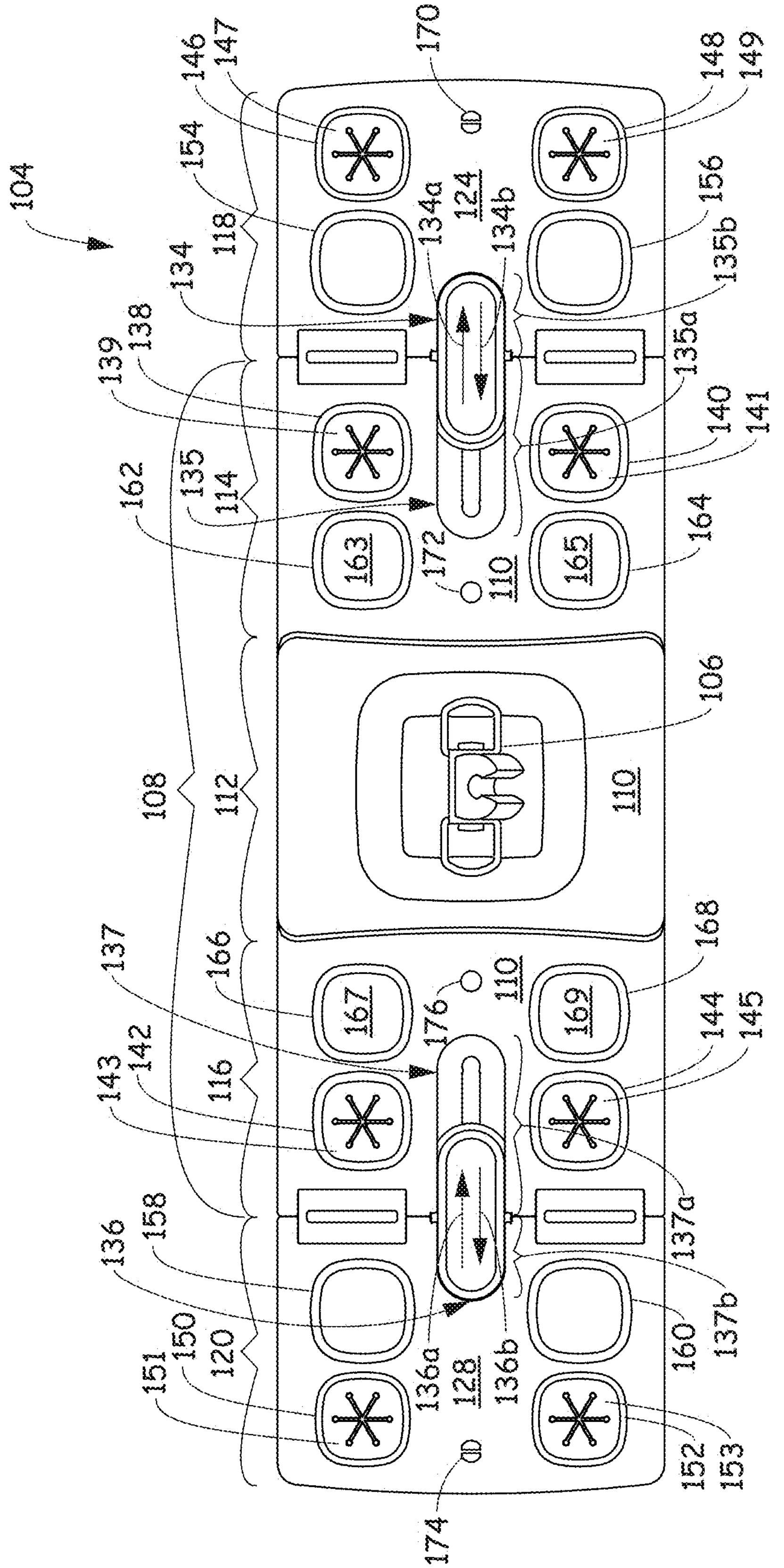
FIG. 3 is a top view of FIG. 2.
Figure 4:
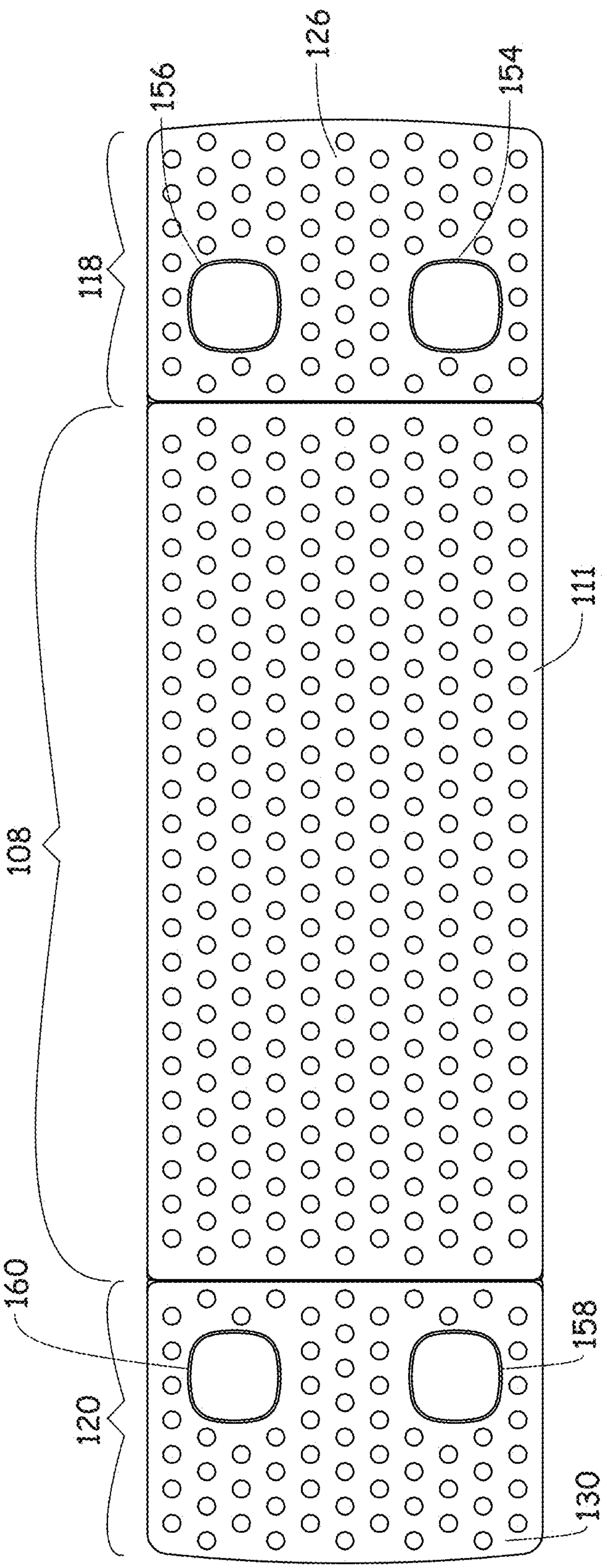
FIG. 4 is a bottom view of FIG. 2.
Figure 5:
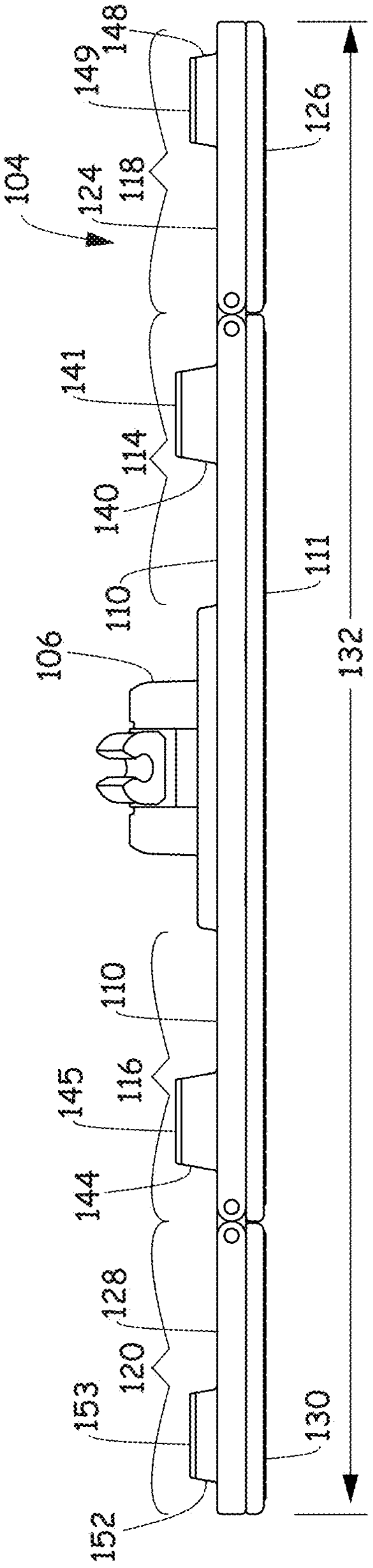
FIG. 5 is a back view of FIG. 2.
Figure 6:
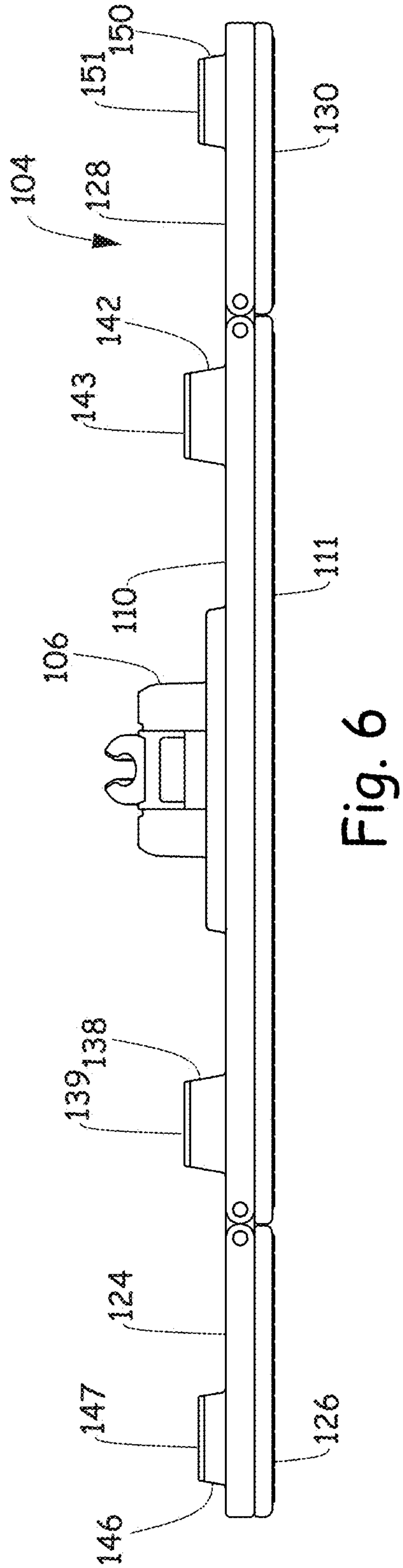
FIG. 6 is a front view of FIG. 2.
Figure 7:
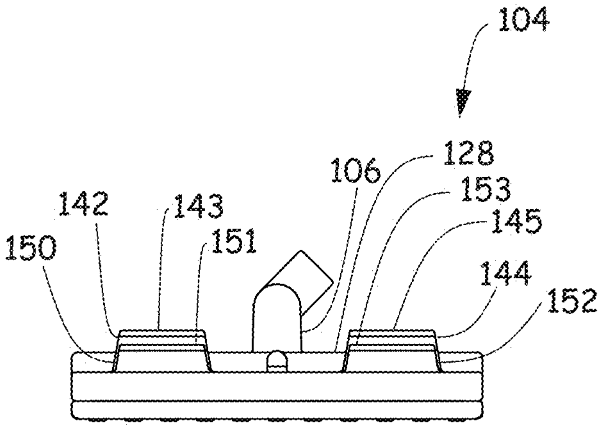
FIG. 7 is a left side view of FIG. 2.
Figure 8:
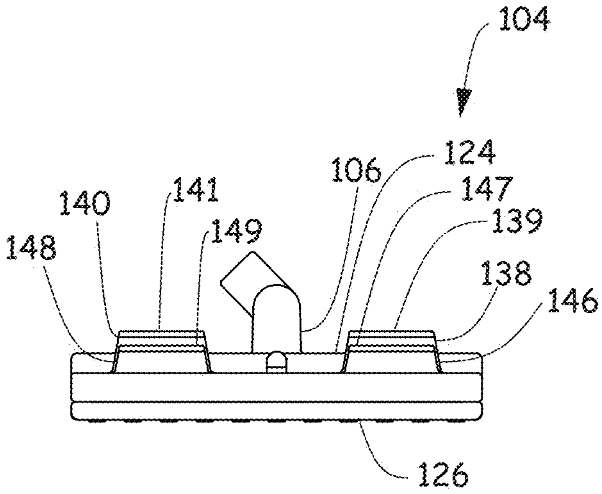
FIG. 8 is a right side view of FIG. 2.

FIG. 2 is a top perspective view, FIG. 3 is a top view, FIG. 4 is a bottom view, FIG. 5 is a back view, FIG. 6 is a front view, FIG. 7 is a left side view and FIG. 8 is a right side view of head 104 configured in the first or unfolded configuration as shown in FIG. 1. Head 104 includes a base 108 having handle mount 106 mounted to an upper surface 110 of base 108. As illustrated, upper surface 110 of base 108 faces in an upward direction. Upper surface 110 of base 108 may not be all within the same plane. Upper surface 110 may have a central raised area 112 and two unraised areas 114 and 116 on either side of the central raised area 112. Handle mount 106 is mounted to upper surface 110 of central raised area 112.

Head 104 further includes at least one rotatable member rotatably coupled to base 108. As illustrated, head 104 includes a first rotatable member 118 rotatably coupled to a right side of base 108 and a second rotatable member 120 rotatably coupled to a left side of base 108. In particular, first rotatable member 118 is rotatably coupled to unraised area 114 of base 108 and second rotatably member 120 is rotatably coupled to unraised area 116 of base 108. For example, first and second rotatable members 118 and 120 are rotatably coupled to base 108 with hinges 122. In FIGS. 1-8, each rotatable member 118 and 120 are rotatably coupled to base with a pair of hinges 122.

First rotatable member 118 includes a first surface 124 and an opposing second surface 126. Second rotatable member 120 includes a first surface 128 and an opposing second surface 130. As illustrated in the first or unfolded configuration in FIGS. 1-8, first rotatable member 118 is fully unfolded causing first surface 124 to face in the same upward direction as upper surface 110 and be planar with upper surface 110 in the unraised area 114. As also illustrated in the first or unfolded configuration, second rotatable member 120 is fully unfolded causing first surface 128 to face in the same upward direction as upper surface 110 and be planar with upper surface 110 in the unraised area 116. With first rotatable member 118 and second rotatable member 120 fully unfolded, head 104 defines a first width 132 (FIG. 5).

Head 104 further includes a first lock that in FIGS. 1-8 is fully engaged. The first lock is configured to lock head 104 in the first or unfolded configuration and includes at least one slider feature slidable in a channel. As illustrated in FIGS. 2 and 3, the first lock includes a first slider feature 134 slidable in a channel 135 and a second slider feature 136 slidable in a channel 137. More specifically, slider features 134 and 136 and corresponding channels 135 and 137 are centrally located along a horizontal axis of the head 104 and between the pair of hinges 122 on each side of base 108 where rotatable members 118 and 120 are rotatably coupled.

Regarding slider feature 134 and channel 135, channel 135 includes a first portion **135*a* (FIG. 3) that is recessed from upper surface 110 in unraised area 114 of base 108 and a second portion 135*b* (FIG. 3) recessed from first surface 124 of first rotatable member 118. In an unlocked position, slider feature 134 is fully positioned within first portion 135*a* of channel 135 and therefore fully positioned within base 108. In a locked position, slider feature 134 is moved to be partially located in first portion 135*a* of channel 135 and partially located in second portion 135*b* of channel 135. In this way, slider feature 134 is slidable in a first direction 134*a* (FIG. 3) to occupy some of first portion 135*a* of channel 135 and all of second portion 135*b* of channel 135 to lock first rotatable member 118 of head 104** into the unfolded configuration.

Regarding slider feature 136 and channel 137, channel 137 includes a first portion **137*a* (FIG. 3) that is recessed from upper surface 110 in unraised area 120 of base 108 and a second portion 137*b* (FIG. 3) recessed from first surface 128 of rotatable member 120. In an unlocked position, slider feature 136 is fully positioned within first portion 137*a* of channel 137 and therefore fully positioned within base 108. In a locked position, slider feature 136 is moved to be partially located in first portion 137*a* of channel 137 and partially located in second portion 137*b* of channel 137. In this way, slider feature 136 is slidable in the first direction 136*a* (FIG. 3) to occupy some of first portion 137*a* of channel 137 and all of second portion 137*b* of channel 137 to lock second rotatable member 120 of head 104** into the unfolded configuration.

Base 108, first rotatable member 118 and second rotatable member 120 also include features for retaining the cleaning cloth or cleaning pad on head 104 in the unfolded configuration. As illustrated in FIGS. 2, 3 and 5-8, base 108 includes at least one attachment feature that protrudes from upper surface 110. In unraised area 114, base 108 includes first attachment feature 138 and second attachment feature 140 that protrude from upper surface 110 to free ends 139 and 141, respectively. In unraised area 116, base 108 includes third attachment feature 142 and fourth attachment feature 144 that protrude from upper surface 110 to free ends 143 and 145, respectively. First rotatable member 118 includes fifth attachment feature 146 and sixth attachment feature 148 that protrude from first surface 124 to free ends 147 and 149, respectively. Second rotatable member 120 includes seventh attachment feature 150 and eight attachment feature 152 that protrude from first surface 128 to free ends 151 and 153, respectively.

Each free end 139, 141, 143, 145, 147, 149, 151 and 153 of each attachment feature 138, 140, 142, 144, 146, 148, 150 and 152 includes a plurality of slits, for example, a plurality of intersecting slits configured to grasp a portion of a disposable cleaning sheet or cleaning pad. Therefore, the slits on each attachment feature secure the cleaning sheet or cleaning pad to head 104 in order to collect dust and dirt on finished floors that sweeper mop 100 is being used to clean. In general and not illustrated, one side of cleaning sheet or cleaning pad that has a width that is at least as large as width 132 of head 104 is folded horizontally over a back edge of head 104 and is grasped by the slits in first, third, fifth and seventh attachment features 138, 142, 146 and 150. The sheet or pad covers or wraps around a lower surface 111 of base 108 and second surfaces 126 and 130 of first and second movable members 118 and 120, fold horizontally over a front edge of head 104 and an opposing side of the cleaning sheet or pad is grasped by the slits in second, fourth, sixth and eighth attachment features 140, 144, 148 and 152.

Figure 9:
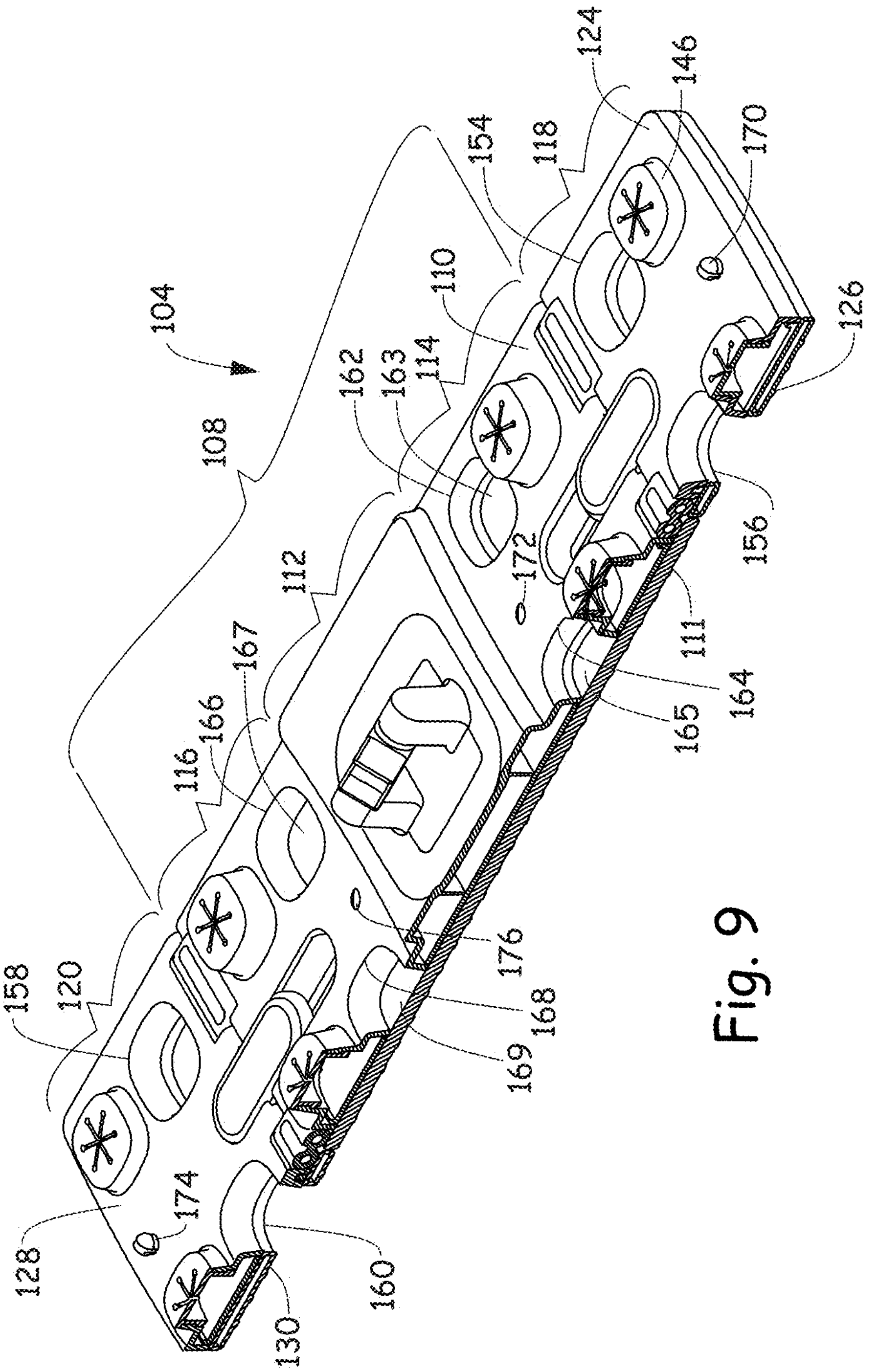
FIG. 9 is a section view of the head taken through the section line in FIG. 2.

FIG. 9 is a section view of head 104 in the first or unfolded configuration taken through the section line in FIG. 2. As illustrated in FIG. 9, base 108, first rotatable member 118 and second rotatable member 120 include certain aperture features and certain recessed features. The aperture and recessed features are for converting head 104 from the first or unfolded configuration to the second or folded configuration. First rotatable member 118 includes a first aperture 154 and a second aperture 156. First and second apertures 154 and 156 extend from first surface 124 to opposing second surface 126 of first rotatable member 118. Second rotatable member 120 includes a third aperture 158 and a fourth aperture 160. Third and fourth apertures 158 and 160 extend from first surface 128 to opposing second surface 130 of second rotatable member 120. In unraised area 114, base 108 includes a first recess 162 and a second recess 164. First recess 162 has a recessed surface 163 that is recessed from upper surface 110 and second recess 164 has a recessed surface 165 that is recessed from upper surface 110. In unraised area 116, base 108 includes a third recess 166 and a fourth recess 168. Third recess 166 has a recessed surface 167 that is recessed from upper surface 110 and fourth recess 168 has a recessed surface 169 that is recessed from upper surface 110.

As clearly shown in FIGS. 2 and 5-8, first and second attachment features 138 and 140 in the unraised area 114 of base 108 protrude a distance from upper surface 110 to free ends 139 and 141, respectively, a greater distance than fifth and sixth attachment features 146 and 148 on first rotatable member 118 protrude from first surface 124 to free ends 147 and 149, respectively. Similarly, third and fourth attachment features 142 and 144 in the unraised area 116 of base 108 protrude a distance from upper surface 110 to free ends 143 and 145, respectively, a greater distance than seventh and eighth attachment features 150 and 152 on second rotatable member 120 protrude from first surface 128 to free ends 151 and 153, respectively. The differences in protrusion distances is important for the second or folded configuration where the attachment features located on rotatable members 118 and 120 are folded away and left unused.

Figure 10:
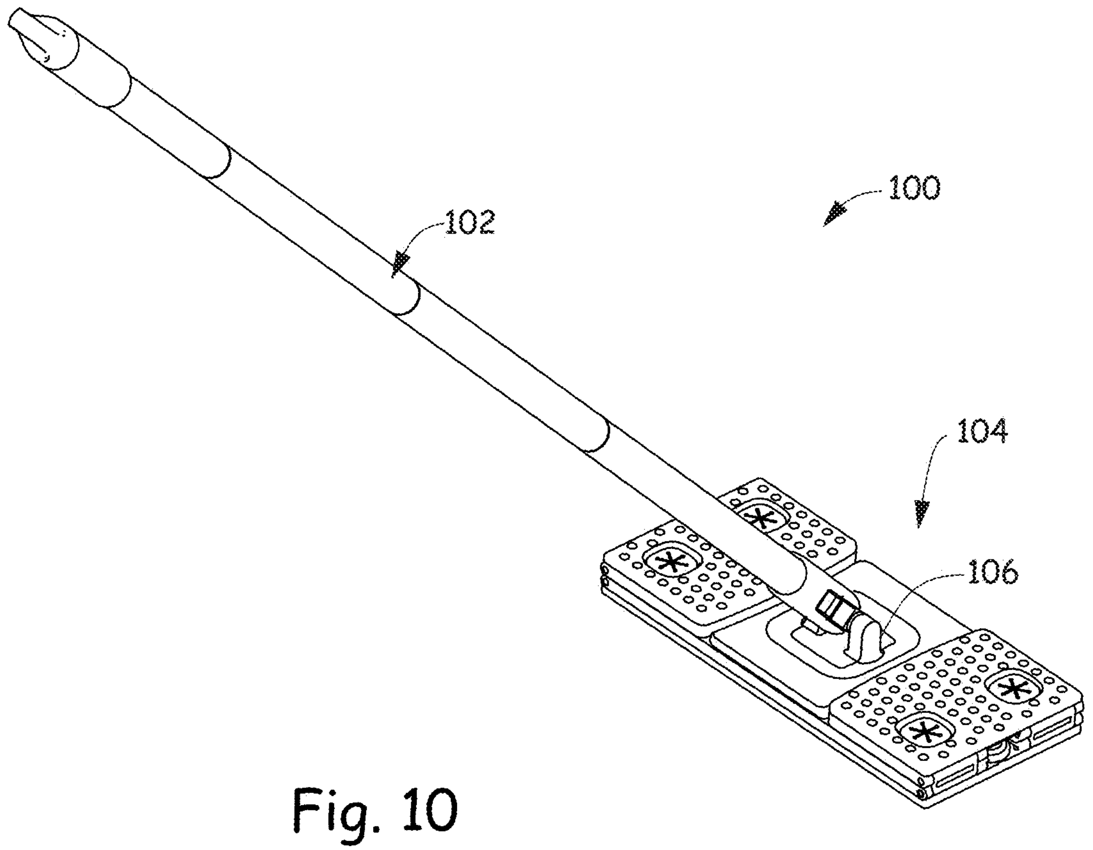
FIG. 10 is a perspective view of the sweeper mop of FIG. 1 in a folded and locked configuration according to an embodiment.

FIG. 10 is a perspective view of sweeper mop or cleaning device 100 having handle 102 and adjustable sized head 104 configured in a second or folded configuration according to an embodiment. As illustrated, an end of handle 102 remains pivotally coupled to head 104 by handle mount 106. Handle 102 is configured to be grasped by a user for manipulating head 104, which is configured to receive a cleaning sheet or pad (not illustrated), along a finished floor to collect and remove dirt and dust.

Figure 11:
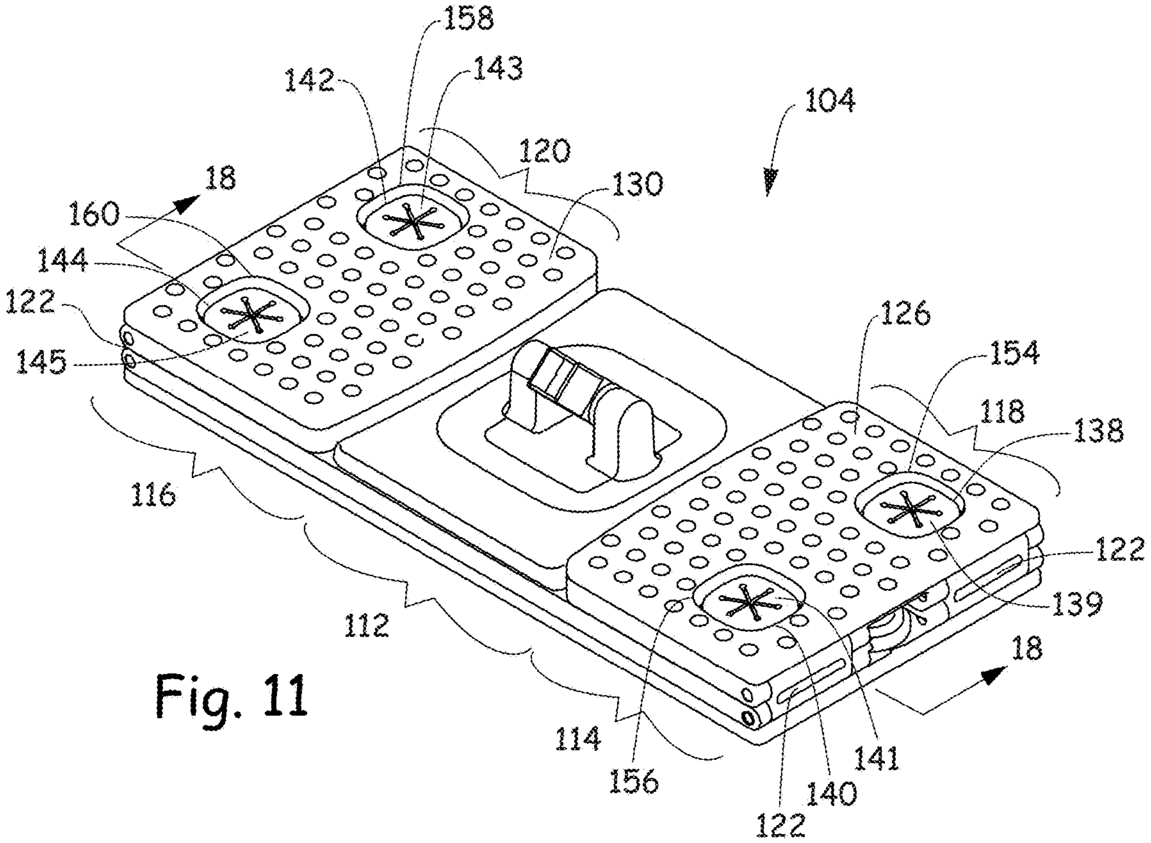
FIG. 11 is a top perspective view of the head of FIG. 10.
Figure 12:
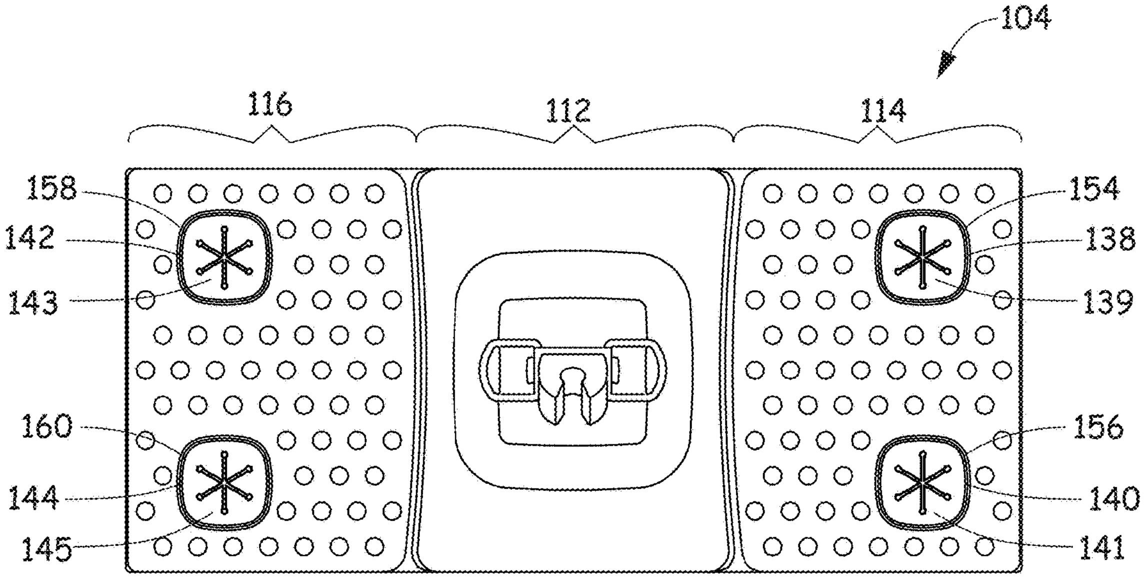
FIG. 12 is a top view of FIG. 11.
Figure 13:
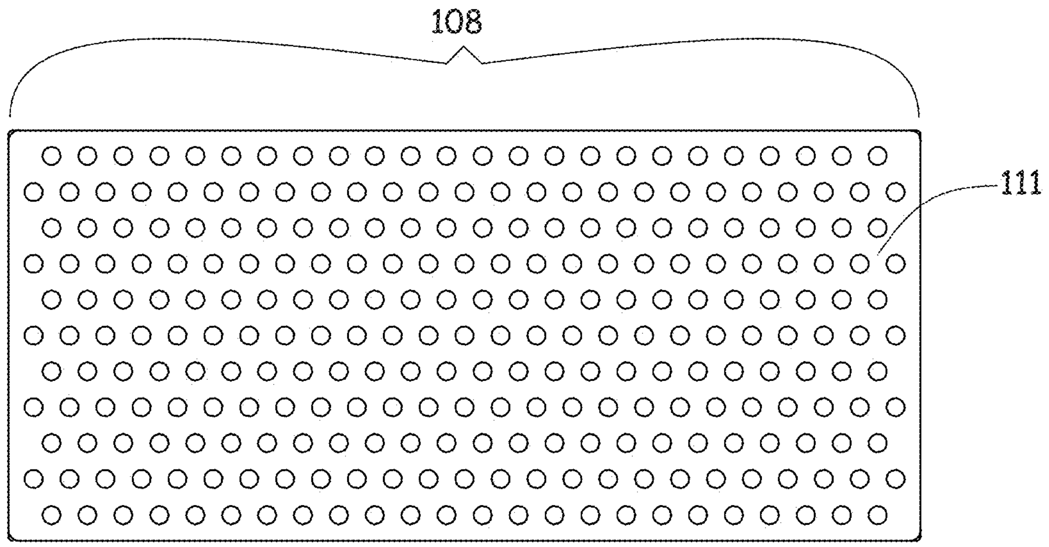
FIG. 13 is a bottom view of FIG. 11.
Figure 14:
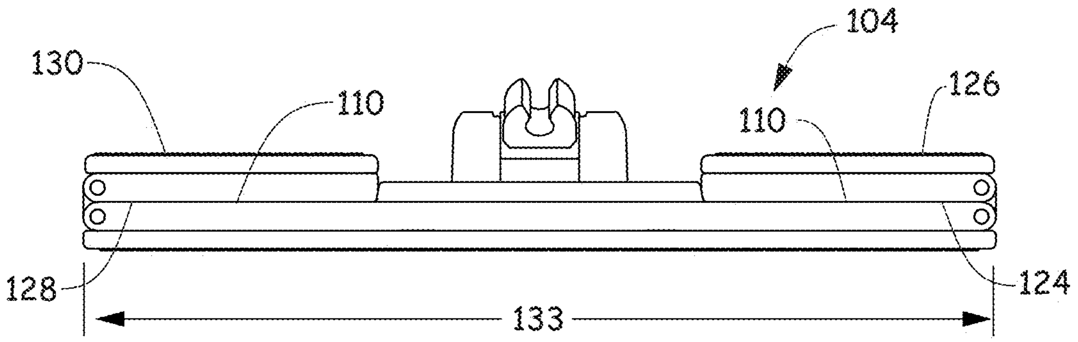
FIG. 14 is a back view of FIG. 11.
Figure 15:
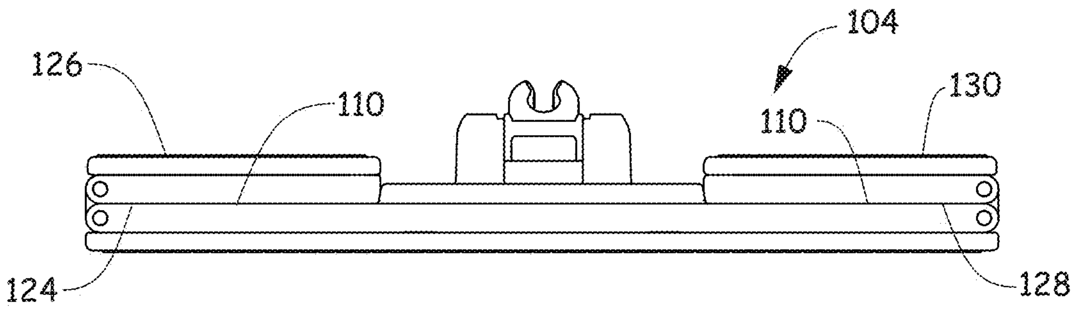
FIG. 15 is a front view of FIG. 11.
Figure 16:
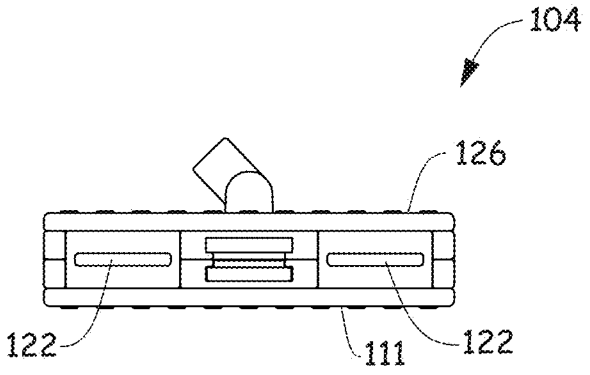
FIG. 16 is a right side view of FIG. 11.
Figure 17:
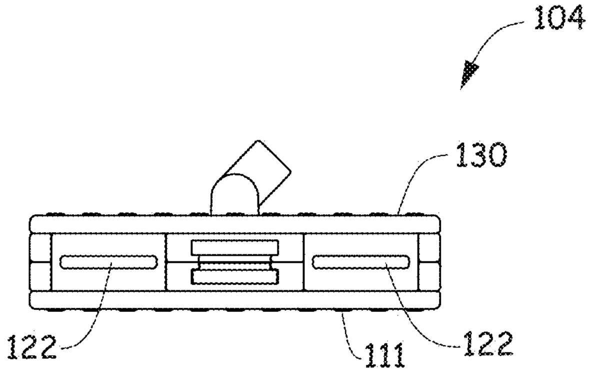
FIG. 17 is a left side view of FIG. 11.

FIG. 11 is a top perspective view, FIG. 12 is a top view, FIG. 13 is a bottom view, FIG. 14 is a back view, FIG. 15 is a front view, FIG. 16 is a left side view and FIG. 17 is a right side view of head 104 configured in the second or folded configuration as shown in FIG. 10. To convert head 104 from the first or unfolded configuration to the second or folded configuration, slidable feature 134 is slid in a second direction **134*b* (FIG. 3) in channel 135 to occupy only first portion 135*a* (FIG. 3) of channel 135 and slidable feature 136 is slid in a second direction 136*b* (FIG. 3) in channel 137 to occupy only first portion 137*a* (FIG. 3) of channel 137. After the first lock is unlocked, first rotatable member 118 is pivoted about hinges 122 so that first surface 124 of rotatable member 118 faces and directly engages with upper surface 110 in the unraised area 114 and second rotatable member 120 is pivoted about hinges 122 so that first surface 128 of rotatable member 120 faces and directly engages with upper surface 110 in the unraised area 116**.

In the folded configuration illustrated in FIGS. 10-17, first and second attachment features 138 and 140 protruding from upper surface 110 in the unraised area 114 of base 108 mate with first and second apertures 154 and 156, respectively, of first rotatable member 118. In addition, fifth and sixth attachment features 146 and 148 having free ends 139 and 141 protruding from first surface 124 of first rotatable member 118 mate with first and second recesses 162 and 164, respectively, that are recessed from upper surface 110 in unraised area 114 of base 108. In this way, fifth and sixth attachment features 146 and 148 having free ends 147 and 149 are stowed way in first and second recesses 162 and 164 and not used in the second or folded configuration, while first and second attachment features 138 and 140 having free ends 139 and 141 are still exposed in the second or folded configuration for use in grasping a cleaning sheet or cleaning pad.

Also in the folded configuration illustrated in FIGS. 10-17, third and fourth attachment features 142 and 144 with free ends 143 and 145 protruding from upper surface 110 in the unraised area 116 of base 108 mate with third and fourth apertures 158 and 160, respectively, of second rotatable member 120. In addition, seventh and eighth attachment features 150 and 152 protruding from first surface 128 of second rotatable member 120 mate with third and fourth recesses 166 and 168, respectively, that are recessed from upper surface 110 in unraised area 116 of base 108. In this way, seventh and eighth attachment features 150 and 152 having free ends 151 and 153 are stowed way in third and fourth recesses 166 and 168 and not used in the second or folded configuration, while third and fourth attachment features 142 and 144 having free ends 143 and 145 are still exposed in the second or folded configuration for use in grasping a cleaning sheet or cleaning pad. With first rotatable member 118 and second rotatable member 120 fully folded, head 104 defines a second width 133 (FIG. 14) that is less than first width 132 (FIG. 5).

Head 104 further includes a second lock that in FIGS. 10-17 is fully engaged. The second lock is configured to lock head 104 in the second or folded configuration. With reference back to FIGS. 2-3 and 9, the second lock includes a male protruding component 170 that protrudes from first surface 124 of first rotatable member 118 and a female receiving component 172 that is recessed from upper surface 110 in the unraised area 114 of base 108. It should be realized that these two components may be swapped such that male protruding component 170 may protrude from upper surface 110 in the unraised area 114 of base 108 and female receiving component 172 may be recessed from first surface 124 of first rotatable member 118. In either embodiment, male protruding component 170 mates with female receiving component 172 to lock first rotatable member 118 into a folded configuration.

The second lock may also include a male protruding component 174 that protrudes from first surface 128 of second rotatable member 118 and a female receiving component 176 that is recessed from upper surface 110 in the unraised area 116 of base 108. It should be realized that these two components may be swapped such that male protruding component 174 may protrude from upper surface 110 in the unraised area 116 of base 108 and female receiving component 176 may be recessed from first surface 128 of second rotatable member 118. In either embodiment, male protruding component 174 mates with female receiving component 176 to lock second rotatable member 120 into a folded configuration.

Figure 18:
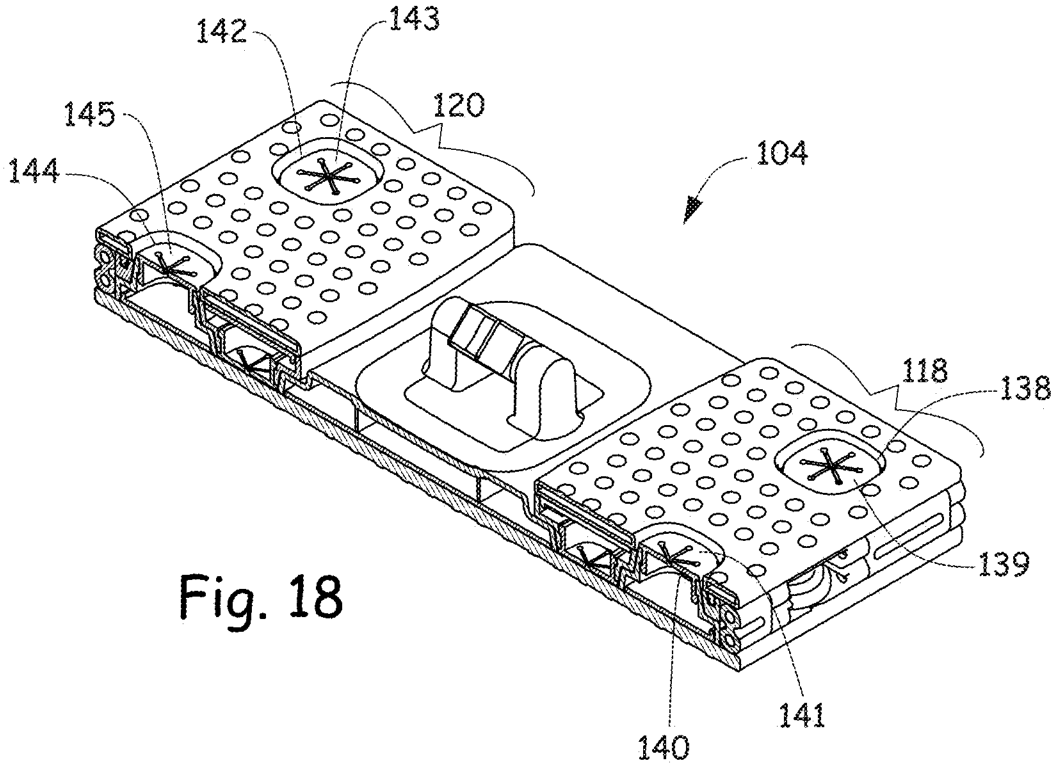
FIG. 18 is a section view of the head taken through the section line in FIG. 11.

FIG. 18 is a section view of head 104 in the second or folded configuration taken through the section line in FIG. 11. As illustrated in FIG. 18, base 108, first rotatable member 118 and second rotatable member 120 includes certain aperture features and certain recessed features. The aperture and recessed features are for converting head 104 from the first or unfolded configuration to the second or folded configuration. As previously discussed, first and second attachment features 138 and 140 in the unraised area 114 of base 108 protrude a distance from upper surface 110 to free ends 139 and 141, respectively, a greater distance than fifth and sixth attachment features 146 and 148 on first rotatable member 118 that protrude from first surface 124 to free ends 147 and 149, respectively. Similarly, third and fourth attachment features 142 and 144 in the unraised area 116 of base 108 protrude a distance from upper surface 110 to free ends 143 and 145, respectively, a greater distance than seventh and eighth attachment features 150 and 152 on second rotatable member 120 that protrude from first surface 128 to free ends 151 and 153, respectively. The attachment features with the greater protrusion are those attachment features that mate with an aperture and include free ends that will be used in the folded configuration for retaining a cleaning sheet or pad. The attachment feature with a lesser protrusion are those attachment features that mate with a recess and are stowed away in the folded configuration.

Figure 19:
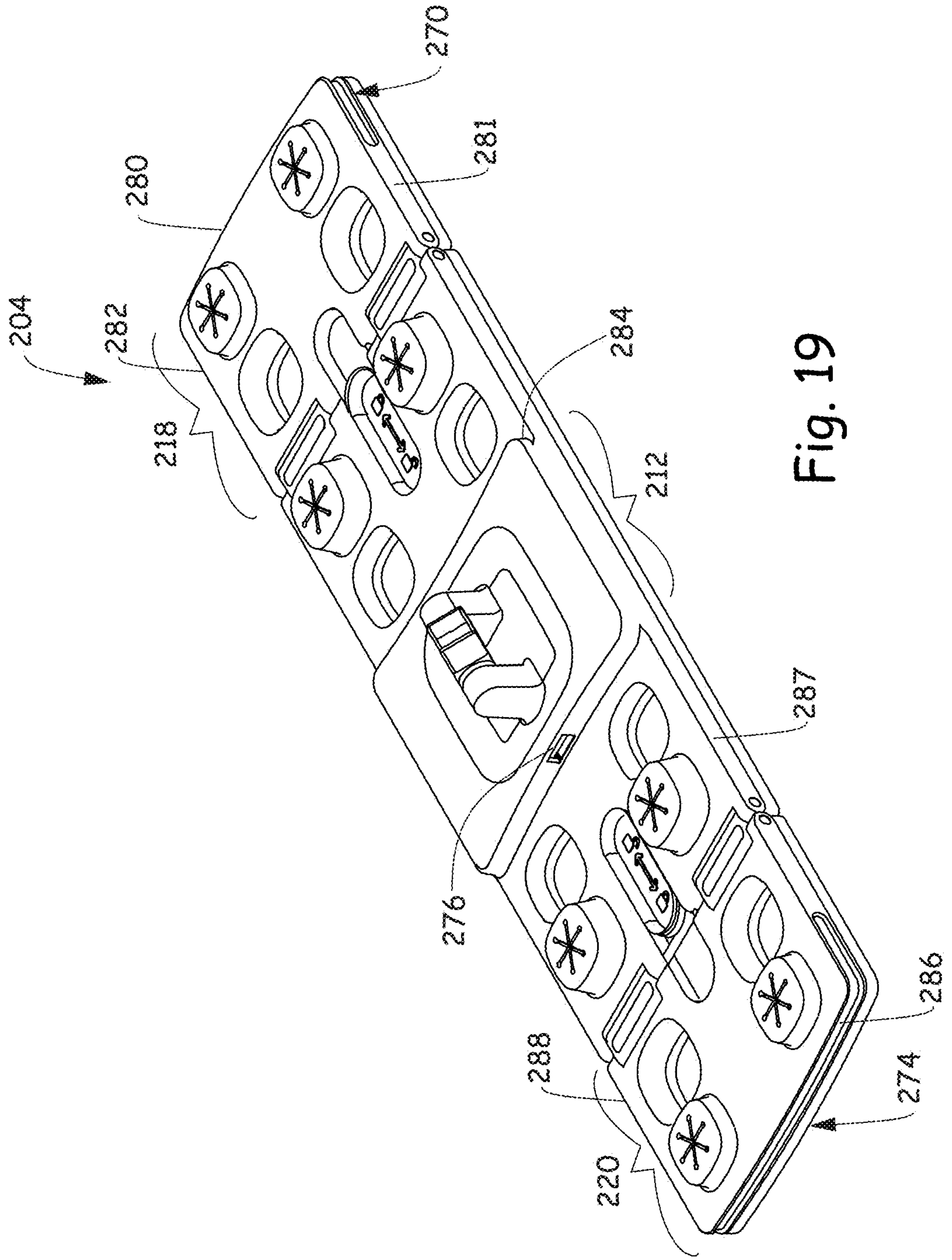
FIG. 19 is a top perspective view of a head in an unfolded and unlocked configuration according to another embodiment.
Figure 20:
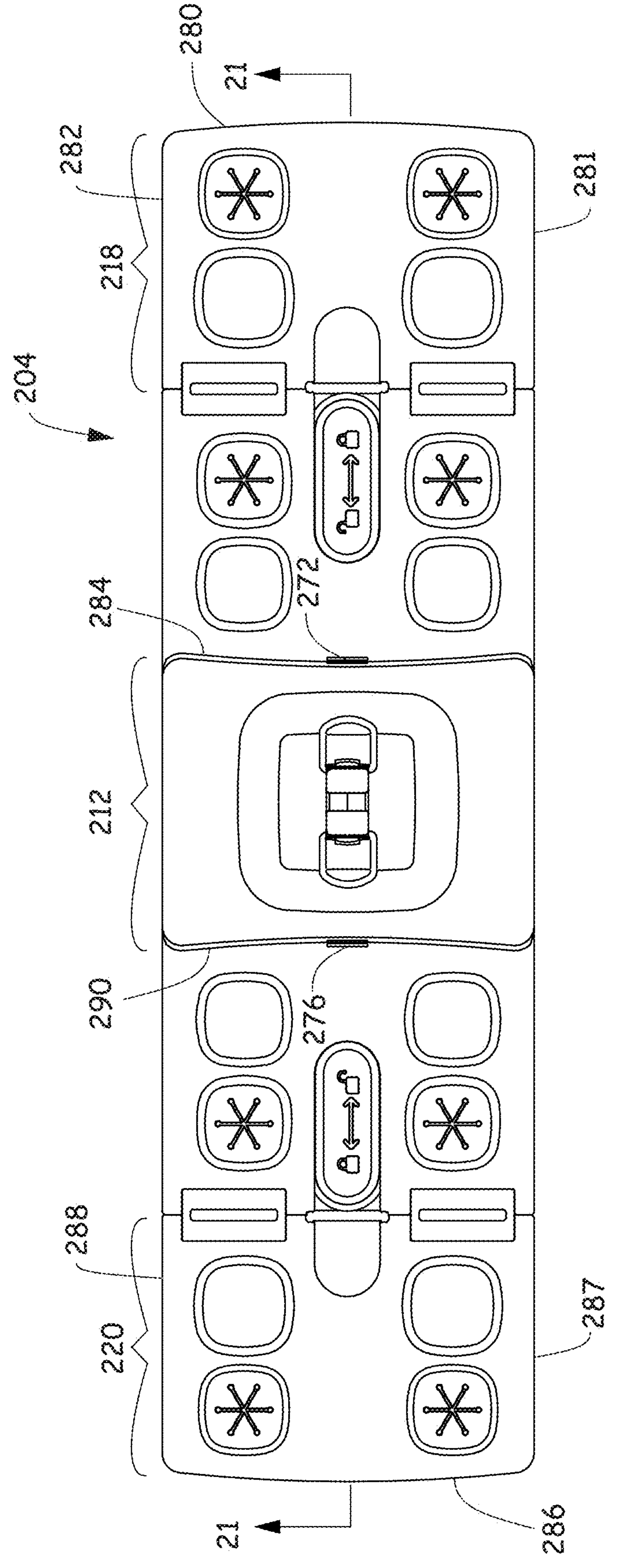
FIG. 20 is a top view of FIG. 19.
Figure 21:
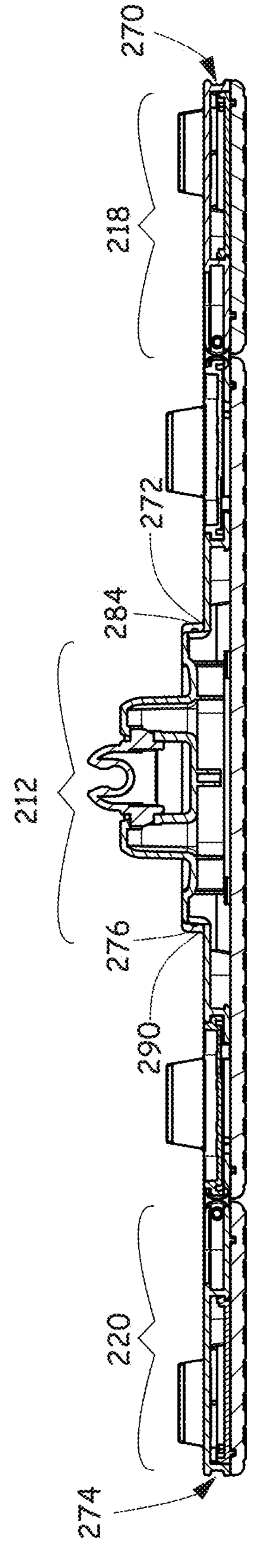
FIG. 21 is a section view of the head of FIG. 19 taken through the section line in FIG. 20.
Figure 22:
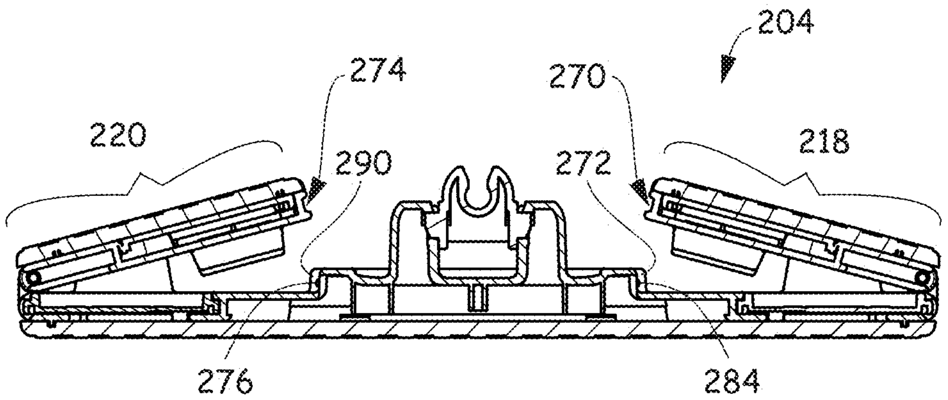
FIG. 22 is the section view illustrated in FIG. 21 but in a partially folded yet unlocked configuration.
Figure 23:
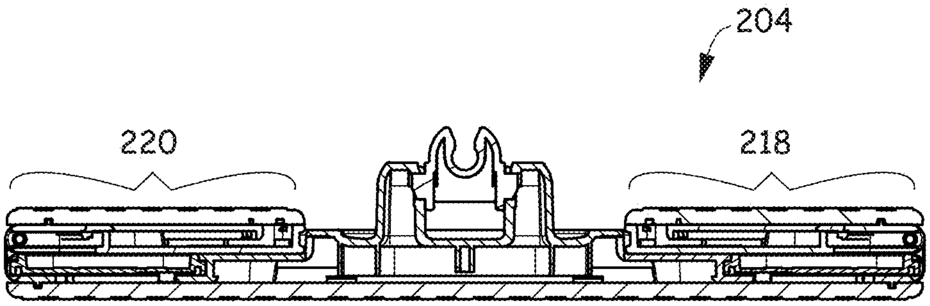
FIG. 23 is the section view illustrated in FIG. 21 but in a fully folded and locked configuration.

FIG. 19 is a top perspective view of a head 204 of a cleaning device in an unfolded and unlocked configuration according to another embodiment. FIG. 20 is a top view of FIG. 19, FIG. 21 is a section view of the head of FIG. 19 taken through the section line in FIG. 20, FIG. 22 is the section view illustrated in FIG. 21 but in a partially folded yet unlocked configuration and FIG. 23 is the section view illustrated in FIG. 21 but in a fully folded and locked configuration. Head 204 includes all of the features of head 104 including the first and second rotatable members and the first lock. However, head 204 includes a different second lock that is configured to hold or lock the first and second rotatable members into a folded configuration.

Second lock of head 204 is configured to lock head 204 in the second or folded configuration and includes a first groove 270 that partially extends about a perimeter of the first rotatable member 218. In particular, first groove 270 extends across the entirety of a free end 180 of first rotatable member 218 and is recessed from free end 180. In addition, first groove 270 extends partially across a front end 281 and partially across a back end 282 of first rotatable member 218 and is recessed from front end 281 and back end 282. The second lock of head 204 also includes a first snap feature 272 that protrudes from a surface of central raised area 212. In particular, first snap feature 272 protrudes from a right side surface 284 of central raised area 212 of head 204 and is made with a material that has some properties of flexibility. In this embodiment, first groove 270 mates or interlocks with first snap feature 272 to lock first rotatable member 218 into a folded or locked configuration.

The second lock may also include a second groove 274 that partially extends about a perimeter of the second rotatable member 220. In particular, second groove 274 extends across the entirety of a free end 286 of second rotatable member 220 and is recessed from free end 286. In addition, second groove extends partially across a front end 287 and partially across a back end 288 of second rotatable member 220 and is recessed from front end 287 and back end 288. The second lock of head 204 also includes a second snap feature 276 that protrudes from a surface of central raised area 212. In particular, second snap feature 276 protrudes from a left side surface 290 of central raised area 212 of head 204 and is made with a material that has some properties of flexibility. In this embodiment, second groove 274 mates or interlocks with second snap feature 276 to lock second rotatable member 218 into a folded or locked configuration.

Figure 24:
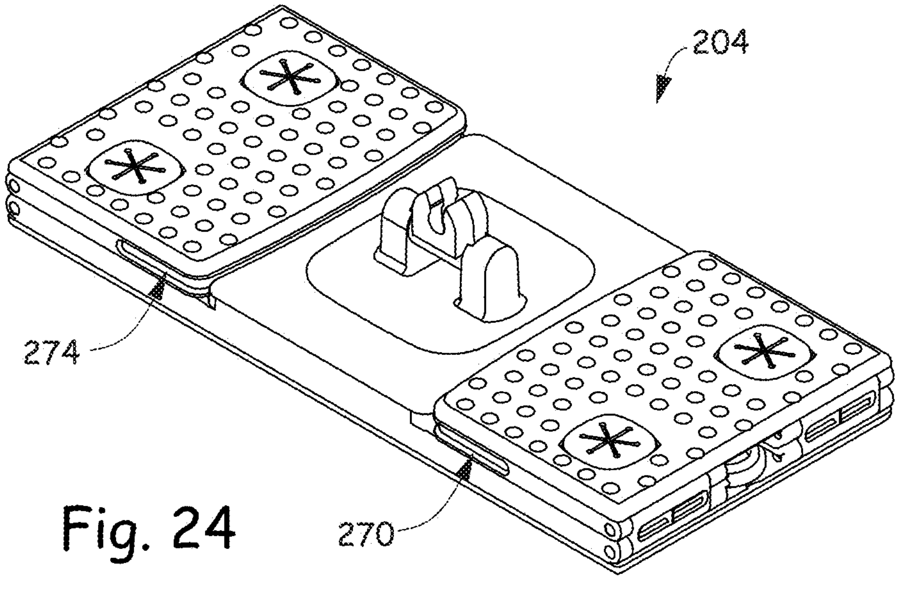
FIG. 24 is a top perspective view of the head of FIG. 19 in a folded and locked configuration according to an embodiment.

FIG. 24 is a top perspective view of the head 204 of FIG. 19 in a folded and locked configuration according to an embodiment. In this folded and locked configuration, first groove 270 and second groove 274 are exposed at a front end of head 204 and a back end (not shown in FIG. 24) of head 204. The extension of first groove 270 and second groove 274 outside of free ends 280 and 286 provide an additional “grip” on the front and back ends of each of first and second rotatable members 218 and 220 to make it easier for users to be able to pull-up and unsnap the first and second rotatable members from the folded or locked position into a unfolded and unlocked position.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A sweeper mop comprising:
- a handle;
- an adjustable sized head configured to receive different sized cleaning sheets, the head comprising:
  - a base having a handle mount mounted to an upper surface of the base and configured to be coupled to an end of the handle;
  - at least one rotatable member rotatably coupled to the base and having a first surface and an opposing second surface;
  - wherein the head includes an unfolded configuration defined by a first width where the first surface of the at least one rotatable member is configured to face in a same direction as the upper surface of the base;
  - wherein the head includes a folded configuration defined by a second width that is less than the first width where the first surface of the at least one rotatable member is configured to face the upper surface of the base;
- a first lock having at least one slider feature configured to retain the head in the unfolded configuration; and
- a second lock having mating components configured to retain the head in the folded configuration.

2. The sweeper mop of claim 1, wherein the at least one slider feature is slidable in a channel, a first portion of the channel is recessed from the upper surface of the base and a second portion of the channel is recessed from the first surface of the at least one rotatable member so that when the head is in the unfolded configuration, the slider feature is slidable from the first portion of the channel into the second portion of the channel to retain the head in the unfolded configuration.

3. The sweeper mop of claim 1, wherein the second lock having mating components comprises a groove that is recessed from an end surface of the rotatable member and snap feature that protrudes from a surface of the base so that in the folded configuration the groove mates with the snap feature.

4. The sweeper mop of claim 3, wherein the snap feature is located on a side of a central raised surface of the base.

5. The sweeper mop of claim 1, wherein the at least one rotatable member further comprises at least one aperture that extends from the first surface to the second surface and at least one attachment feature that protrudes from the first surface of the rotatable member to a free end.

6. The sweeper mop of claim 5, wherein the base further comprises at least one recess that is recessed from the upper surface of the base and at least one attachment feature that protrudes from the upper surface of the base to a free end.

7. The sweeper mop of claim 6, wherein in the folded configuration the first surface of the rotatable member is configured to engage with the upper surface of the base such that the at least one protruding attachment feature of the base mates with the aperture of the rotatable member and the at least one protruding attachment feature of the rotatable member mates with the at least one recess of the base.

8. The sweeper mop of claim 6, wherein the free end of the at least one attachment feature of the base and the free end of the at least one attachment feature of the rotatable member comprises a plurality of intersecting slits that are configured to grasp a portion of a cleaning sheet.

9. The sweeper mop of claim 1, wherein the at least one rotatable member of the adjustable sized head comprises a first rotatable member rotatably coupled to a first side of the base and a second rotatable member rotatably coupled to an opposing second side of the base.

10. A sweeper mop comprising:

a handle;

an adjustable sized head configured to receive a cleaning sheet including a base having a mount coupled to an end of the handle and at least one rotatable member rotatably coupled to the base, wherein the adjustable sized head includes an unfolded configuration and a folded configuration;

wherein the at least one rotatable member includes a first surface and an opposing second surface, at least one aperture that extends from the first surface to the second surface and at least one first attachment feature that protrudes from the first surface of the rotatable member to a free end;

wherein the base includes an upper surface, at least one recess that is recessed from the upper surface of the base and at least one second attachment feature that protrudes from the upper surface of the base to a free end; and wherein in the folded configuration the first surface of the rotatable member is configured to engage with the upper surface of the base such that the at least one protruding second attachment feature of the base mates with the aperture of the rotatable member and the at least one protruding first attachment feature of the rotatable member mates with the at least one recess of the base.

11. The sweeper mop of claim 10, further comprising a first lock having at least one slider feature configured to retain the adjustable sized head in the unfolded configuration.

12. The sweeper mop of claim 11, wherein the at least one slider feature is slidable in a channel, a first portion of the channel is recessed from the upper surface of the base and a second portion of the channel is recessed from the first surface of the at least one rotatable member so that when the adjustable sized head is in the unfolded configuration, the at least one slider feature is slidable from the first portion of the channel into the second portion of the channel to retain the head in the unfolded configuration.

13. The sweeper mop of claim 10, further comprising a second lock having mating components configured to retain the adjustable sized head in the folded configuration.

14. The sweeper mop of claim 13, wherein the second lock having the mating components comprises a groove that is recessed from an end surface of the rotatable member and a snap feature that protrudes from a surface of the base so that in the folded configuration the groove mates with the snap feature.

15. The sweeper mop of claim 14, wherein the snap feature is located on a side of a central raised surface of the base.

16. A sweeper mop with an adjustable sized head comprising:

a base having a mount coupled to an end of the handle, wherein the base includes an upper surface, at least one recess that is recessed from the upper surface of the base and at least one first attachment feature that protrudes from the upper surface of the base to a free end;

at least one rotatable member rotatably coupled to the base, wherein the at least one rotatable member includes a first surface, an opposing second surface, at least one aperture that extends from the first surface to the second surface of the rotatable member and at least one second attachment feature that protrudes from the first surface of the rotatable member to a free end;

an unfolded configuration where the first surface of the rotatable member is configured to face in a same direction as the upper surface of the base; and a folded configuration where the first surface of the rotatable member is configured to engage with the upper surface of the base such that the at least one protruding second attachment feature of the base mates with the aperture of the rotatable member and the at least one protruding first attachment feature of the rotatable member mates with the at least one recess of the base.

17. The sweeper mop head of claim 16, further comprising a first lock having at least one slider feature configured to retain the sweeper mop head in the unfolded configuration.

18. The sweeper mop head of claim 17, wherein the at least one slider feature is slidable in a channel, a first portion of the channel is recessed from the upper surface of the base and a second portion of the channel is recessed from the first surface of the at least one rotatable member so that when the sweeper mop head is in the unfolded configuration, the slider feature is slidable from the first portion of the channel into the second portion of the channel to lock the head in the unfolded configuration.

19. The sweeper mop of claim 16, further comprising a second lock having mating components configured to retain the sweeper mop head in the folded configuration.

20. The sweeper mop of claim 19, wherein the second lock having the mating components comprises a groove that is recessed from an end surface of the rotatable member and a snap feature that protrudes from a side of a central raised surface of the base so that in the folded configuration the groove mates with the snap feature.

* * * * *